United States Patent [19]

Fujisawa et al.

[11] 3,815,039

[45] June 4, 1974

[54] AUTOMATIC NOISE REDUCTION SYSTEM

[75] Inventors: Kiyoji Fujisawa; Masao Tomita, both of Osaka, Japan

[73] Assignee: Matsushita Electric Industrial Co., Ltd., Kadoma, Osaka, Japan

[22] Filed: Apr. 14, 1972

[21] Appl. No.: 244,098

[30] Foreign Application Priority Data

Apr. 16, 1971 Japan .......................... 47-4624650
Sept. 23, 1971 Japan .......................... 46-4674374

[52] U.S. Cl. .................... 330/51, 330/86, 330/107, 330/149, 333/14

[51] Int. Cl. .............................................. H03f 1/36

[58] Field of Search .............. 330/51, 107, 86, 149; 333/14; 179/1 D, 100.2 K

[56] References Cited

UNITED STATES PATENTS 3,178,698 4/1965 Graham .......................... 330/86 X

*Primary Examiner*—Herman Karl Saalbach
*Assistant Examiner*—James B. Mullins
*Attorney, Agent, or Firm*—Wenderoth, Lind & Ponack

[57] ABSTRACT

An automatic noise reduction system has a signal amplifier, a resistor as a first impedance circuit and a second impedance circuit which comprises resistors, capacitor and a variable resistance element. The frequency response of the second impedance circuit changes according to the resistance value of the variable resistance element and that resistance value is changed by a control circuit. In recording, the resistor constituting the first impedance circuit is connected to the input side of the signal amplifier and the second impedance circuit is connected to the negative feedback loop of the signal amplifier, and the control means provides a D.C. voltage in response to the input signal, so that the signal to be recorded is emphasized. In reproducing, the connection is reversed and the control means provides a D.C. voltage in response to the output signal, so that the reproduced signal is modified with characteristics complementary to the emphasized characteristics and provided with the same wave form as that of the original signal with reduced record medium noises.

10 Claims, 14 Drawing Figures

AUTOMATIC NOISE REDUCTION SYSTEM

FIELD OF THE INVENTION

This invention relates to a noise reduction system, and more particularly relates to an automatic noise reduction system for reducing tape noise in a tape recorder or a noise introduced in a transmission line.

DESCRIPTION OF THE PRIOR ART

In general, an output signal derived from an amplifier contains various noises such as amplifier noise, recording medium noise, transmission noise, and other undesired signals. Therefore, the signal-to-noise ratio of the output signal of the amplifier is limited to a certain value and the quality of the output signal is inevitably degraded.

Up to the present, several methods for reducing noise have been developed. Any system for reducing the audibility of such noises can be classified broadly into two basic types, i.e., a type which reduces the noises only through the reproduction process or at the receiving side and a type which reduces the noises through both the recording process and the reproduction process of a signal recording and reproducing system or at both the transmitting and receiving sides of a signal transmitting and receiving system. As an example of the first type, there is a system for varying the high frequency response of the amplifier automatically in accordance with the input signal level. However, in this system, a high fidelity reproduction of the signal is not achieved because the high frequency response at a low signal level is suppressed. There is another system in which the reproduced signal is separated into several bands by several band pass filters and the small amplitude region of the signal in each band is cut off, and then the band signals are recombined. But such a system is not used practically because of difficulty of reducing the harmonic distortion. Further, there are some systems which remove the noises during the absence of signals. However, such a system can not prevent the noise which becomes annoying when the input signal is weak, since the noises during the presence of signals are not reduced.

As an example of the second type, there is a system by which the signal to be recorded is modified by employing a non-linear circuit so as to emphasize the low level component of the signal, and the signal reproduced from the recording medium is modified by a non-linear circuit having complementary characteristics to that of the non-linear circuit employed during the recording process, so that a signal can be reproduced having the same wave form as that of the original signal. In that system, the complementary characteristics are controlled by the pilot signal. Otherwise, by using two recording tracks, the input signal is recorded on the two tracks at different recording levels from each other, and during reproduction the track is selected which provides a signal of less distortion and lower noise by an electronic switch. However, these systems have several in that the circuit arrangement becomes complex because these systems need the means for producing the pilot signal or double recording tracks. Further, because adjustment of the circuit is difficult and complementary characteristics are not precise, the harmonic distortion is apt to appear in the output signal.

BRIEF SUMMARY OF THE INVENTION

Therefore, an object of the present invention is to provide an improved automatic noise reduction system which reduces the recording medium noise, transmission line noise and other undesired signals.

Another object of the invention is to provide an automatic noise reduction system which reduces the high frequency components of noises.

Still another object of the invention is to provide an automatic noise reduction system which reduces noises during the presence of weak signals and during the absence of signals.

A further object of the invention is to provide an automatic noise reduction system which does not cause degeneration of signals due to distortion and frequency response alteration.

A still further object of the invention is to provide an automatic noise reduction system which reduces modulation noises which causes the signal level variation.

An additional object of the invention is to provide an automatic noise reduction system which reduces the noises by means of the simple circuit configuration.

BRIEF DESCRIPTION OF THE DRAWINGS

The above objects of the invention will be apparent on consideration of the following detailed description with reference to the accompanying drawings, in which.

Figure 1:
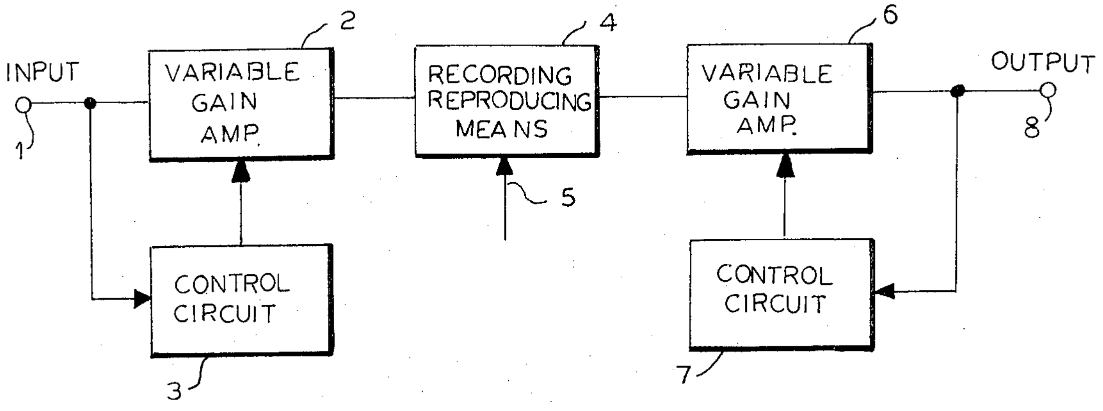
FIG. 1 is a basic block diagram of an automatic noise reduction system according to the present invention.

FIGS. *2a*, *2b* and *2c* are graphs illustrating input-output characteristics, respectively relating to the system shown in FIG. 1.

Figure 3:
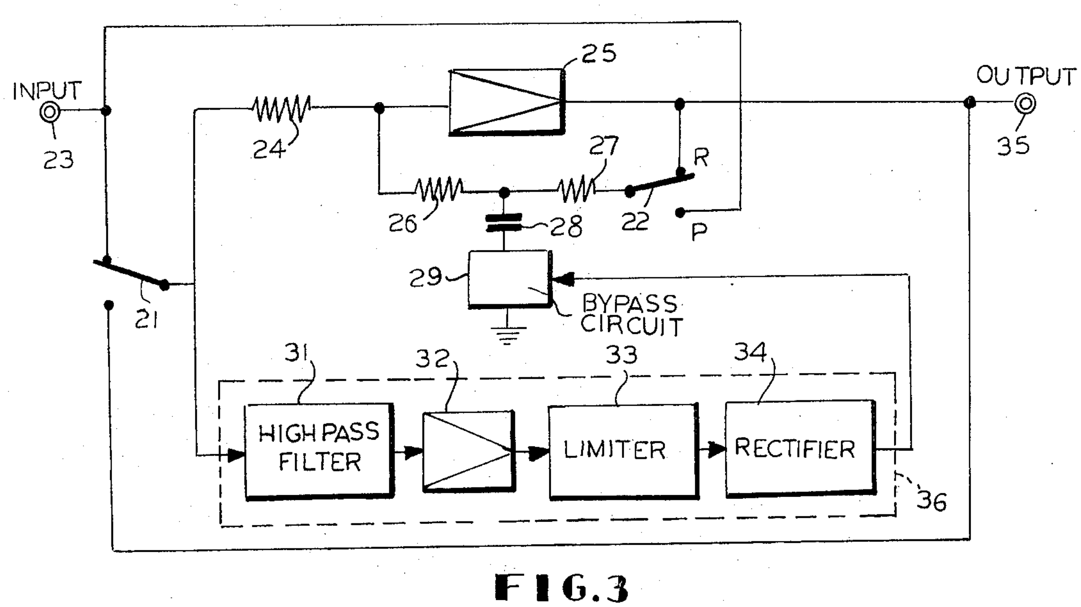

FIG. 3 is a more detailed block diagram of the automatic noise reduction system according to the present invention.

Figure 4:
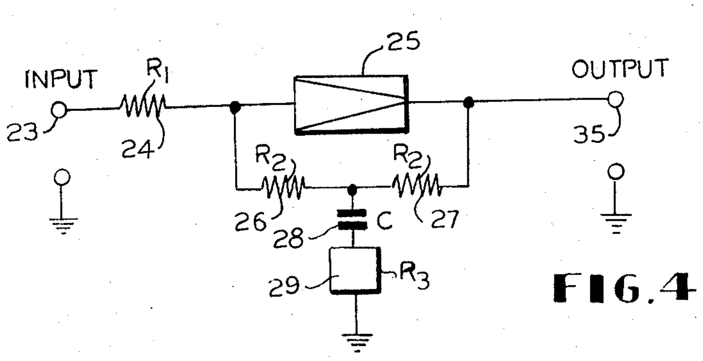

FIG. 4 is an equivalent circuit diagram of the embodiment of FIG. 3 during the recording process.

Figure 5:
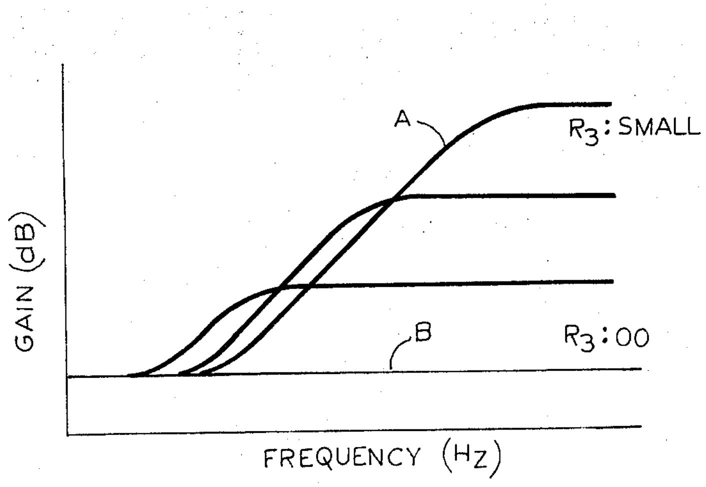

FIG. 5 is a graph illustrating frequency characteristics of the amplitude for the equivalent circuit diagram of FIG. 4.

Figure 6:
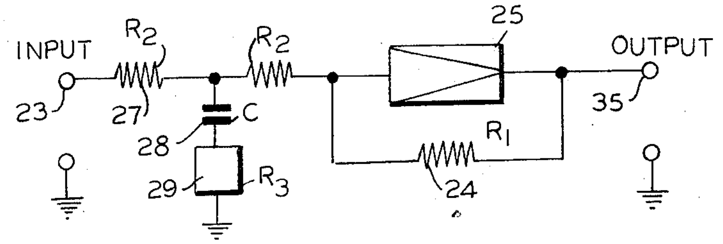

FIG. 6 is an equivalent circuit diagram of the embodiment of FIG. 3 during the reproducing process.

Figure 7:
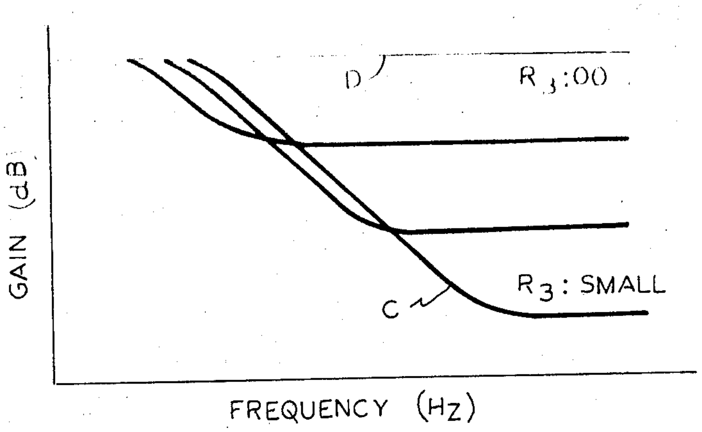

FIG. 7 is a graph illustrating frequency characteristics of the amplitude for the equivalent circuit diagram of FIG. 6.

Figure 8:
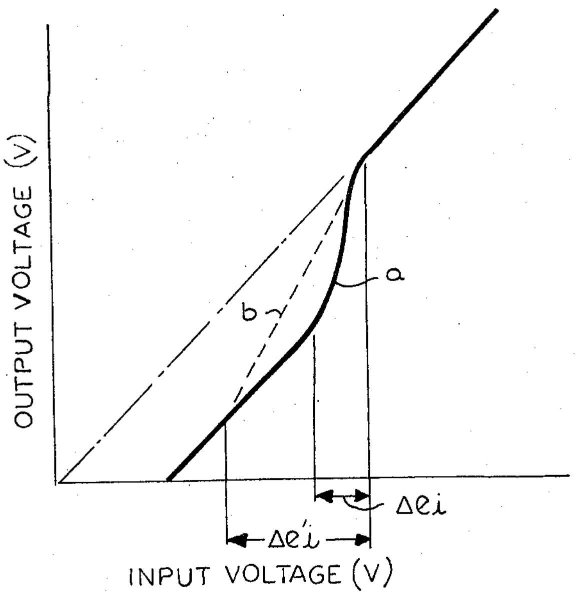
Figure 9:
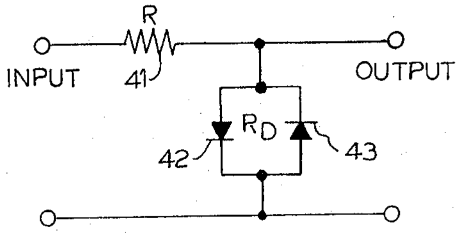
Figure 10:
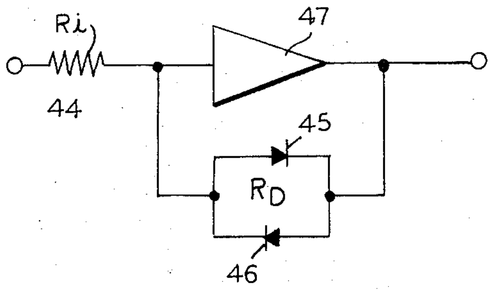

FIG. 8 is a graph illustrating an expander characteristics for a limiter shown in FIGS. 9 and 10.

FIG. 9 is a circuit diagram of a limiter used in a control means for the noise reduction system according to the invention.

FIG. 10 is a circuit diagram of a limiter amplifier used in the noise reduction system shown in FIG. 3.

Figure 11:
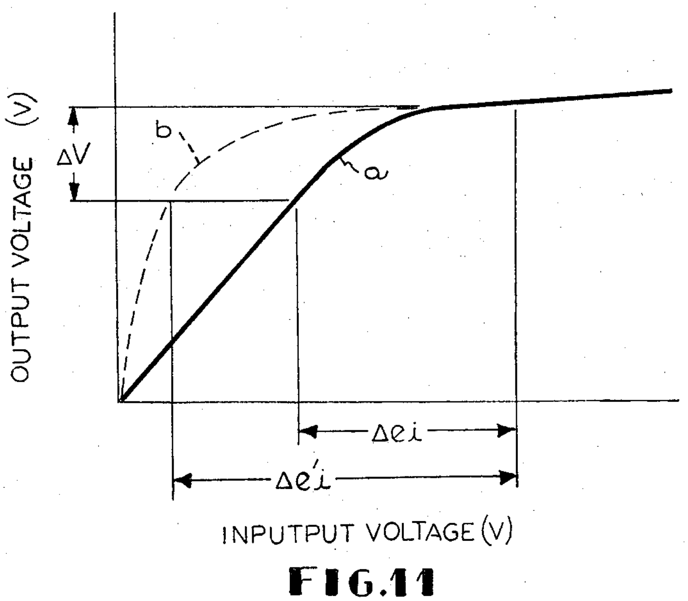

FIG. 11 is a graph illustrating input-output characteristics of the circuit shown in FIGS. 9 and 10.

Figure 12:
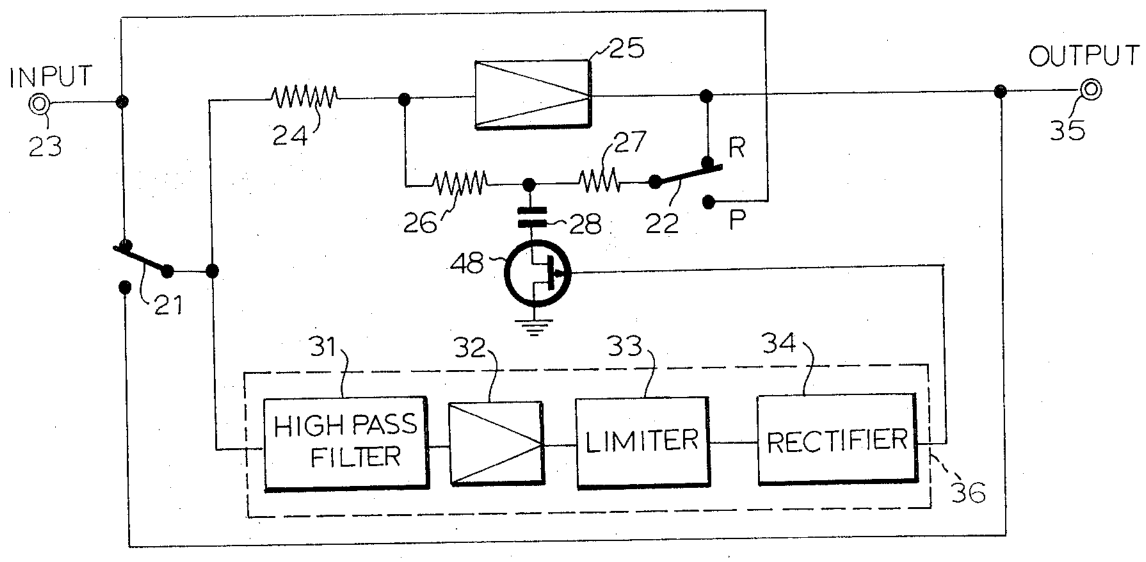

FIG. 12 is a block diagram similar to FIG. 3, but showing another embodiment of the invention.

DETAILED DESCRIPTION OF THE INVENTION

An automatic noise reduction system according to the invention is used for a signal handling system which has first and second functions such as a signal recording and reproducing system or a signal transmitting and receiving system, and comprises a signal amplifier having a negative feedback loop therein, a first impedance means such as a resistor connected, during said first function, to an input side of the signal amplifier, a second impedance means connected, during said first function, to the negative feedback loop of the signal amplifier, and two switches which engage with each other and cause said first impedance to connect with said negative feedback loop and said second impedance means to connect with said input side of saaid signal amplifier when said first function is switched to said second function, whereby the input-output transfer characteristic of said automatic noise reduction system during said first function is substantially complementary to that during said second function. The second impedance means comprises two resistors connected in series with each other and a bypass circuit which is composed of a capacitor and a variable resistance means such as a field effect transistor connected in series with each other. The resistance of the variable resistance means is controlled according to a D.C. voltage provided from a control means which is composed of a high pass filter, an amplifier, a limiter and a rectifier including capacitors therein. The control means is coupled, at one end, to said second impedance means and is connected, at the other end, to a junction point of said first impedance means and one of said two switches, whereby said second impedance means is provided with a D.C. voltage related to an input signal to said automatic noise reduction system during said first function or an output signal of said automatic noise reduction system during said second function.

During recording process in case of the signal recording and reproducing system such as a tape recorder, an input signal having a low level and high frequency components is emphasized by the system and recorded on the recording means. During reproducing process, the first and second impedance means are exchanged, and the control means provides a D.C. voltage related to the high frequency component of the output signal. Accordingly, the reproduced signal is modified by the input-output characteristic of the system, which is complementary to that of the system during the recording process, and so the reproduced signal is provided with the same waveform as that of the original signal. Because the record medium noise is related only to the deemphasized characteristics during the reproducing process, it can be reduced.

In the following, there will be discribed a tape recorder as an example of a signal handling system having the first function and the second function in which the noise reduction systems of the invention is used.

Now, referring to FIG. 1, an input signal applied to an input terminal 1 is amplified by a variable gain amplifier 2, the gain of which is controlled by a signal from a control circuit 3. The control circuit 3 provides a control signal in response to the input signal. The variable gain amplifier 2 and the control circuit 3 are arranged on the record side, and a signal the amplitude of which is controlled by the variable gain amplifier 2, which gain is changed according to the amplitude of the input signal, is recorded by a recording-reproducing means designated by reference 4. During the recording process, the noises such as tape hiss are also recorded as shown by an arrow 5. A variable gain amplifier 6 and a control circuit 7 are arranged on the reproduction side so that the gain of the variable gain amplifier 6 is controlled according to the amplitude of the output signal provided at an output terminal 8.

Figure 2A:
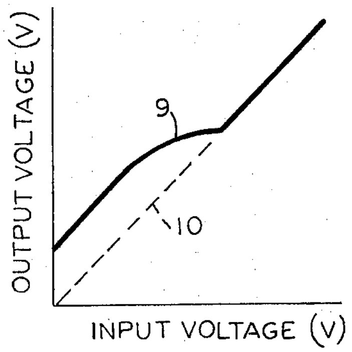
Figure 2B:
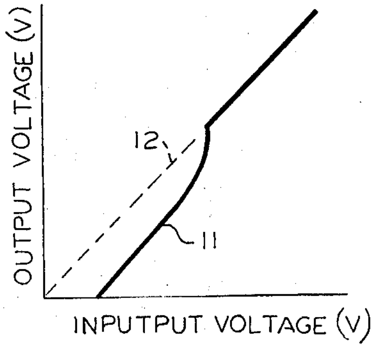
Figure 2C:
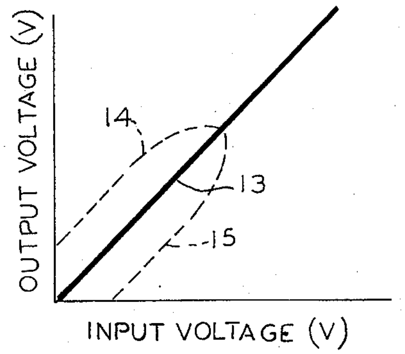

FIG. 2 (a) shows the input-output transfer characteristic of the tape recorder on the record side, in which a curve 9 represents a compression characteristic and this is formed in such a way that the low level signal components of the input signal are emphasized by the variable gain amplifier 2 and the control circuit 3 in FIG. 1. The curve 10 represents a conventional characteristic for the record side when the present invention is not used. FIG. 2*b* shows the input-output transfer characteristic of the tape recorder for the reproduction side, for which a curve 11 represents a expansion characteristic and this is formed in such a way that the low level signal components of the reproduced signal are de-emphasized by the variable gain amplifier 6 and the control circuit 7 in FIG. 1. A curve 12 represents an conventional characteristic for the reproduction side when the present invention is not used. The compression characteristic 9 and the expansion characteristic 11 are complementary as shown by reference numerals 14 and 15 in FIG. 2*c*.

Therefore, it is possible to get a linear overall characteristic as shown by 13 in FIG. 2*c*. That is, the overall characteristic of the signal which is obtained from the system having both the compression and the expansion characteristics on the record side and reproduce side becomes the same as the linear characteristic of the signal which is obtained from a system having conventional characteristics 10 and 12 on the record and reproduce side respectively. This means that the output signal delivered from the output terminal 8 is equal to the input signal applied to the input terminal 1. However, the noises such as tape hiss are affected only by the expansion characteristic shown by the curve 11 in FIG. 2(b) because such noises are introduced after the signal is handled by the part of the system having the compression characteristic shown by the curve 9 in FIG. 2*a*. Therefore, the noises such as tape hiss are reduced compared with the noises produced by a system with the linear characteristic shown by the curve 12 in FIG. 2*b*.

When the signal lever is lower than the expansion threshold point, i.e., the level at which the expansion characteristic 11 is provided in FIG. 2*b*, the noises are reduced. But, when the signal level is higher than that level, the noises are not reduced. However, the noises in a high level signal are not so annoying due to the masking effect. The above discription is of the principle of the noise reduction system according to the present invention, and in the following one embodiment of the present invention is described in more detail.

FIG. 3 is a block diagram of the noise reduction system of the invention, in which switches 21 and 22 are ganged with a switch for changing between the recording and reproducing operation of the tape recorder. During the recording process these switches are connected to a record side R, and during reproducing process they are connected to a reproduction side P as indicated in FIG. 3, respectively. The terminal of the R side of the switch 21 is connected to an input terminal 23 and the terminal of the P side is connected to an output terminal 35. The common terminal of the switch 21 is connected to a high pass filter 31 at the input end of a control circuit 36 and to an amplifier 25 through a resistor 24. The terminal of the R side of the switch 22 is connected to the output terminal 35, and the terminal of the P side is connected to the input terminal 23. The common terminal of the switch 22 is connected to the input side of an amplifier 25 through resistors 26 and 27 which are connected in series with each other. The junction point of the resistors 26 and 27 is connected to a bypass circuit which is composed of a capacitor 28 and a variable resistance means 29 connected in series with each other. One of the terminals of the variable resistance means is grounded. The control circuit 36 is composed of the high pass filter 31, a limit amplifier 32, a limiter 33 and a rectifier 34 which includes at least one capacitor, and the output terminal of the rectifier 34 is connected to the variable resistance means 29 so as to change the resistance of the variable resistance means according to the signal supplied from the rectifier 34.

Referring to FIG. 3, when the switches 21 and 22 are connected to the R side, the signal applied to the input terminal 23 is fed to the input side of the amplifier 25 through the resistor 24 and amplified by the amplifier 25. The output signal of the amplifier 25 is supplied to the output terminal 35, and a part of the output signal is fed back to the input side of the amplifier 25 through the switch 22 and the resistors 27 and 26. The junction point of the resistors 26 and 27 is grounded through the capacitor 28 and the variable resistance means 29 which are connected in series with each other. On the other hand, the input signal is also applied to the high pass filter 31 through the switch 21, and the high frequency components which are passed through the high pass filter 31 the amplified by the limit amplifier 32 and limited by the limiter 33, and then rectified by the rectifier 34. Since the rectifier 34 has at least one capacitor, a D.C. voltage is provided from the rectifier 34. Accordingly, a control voltage related to the high frequency components contained in the input signal is provided at the output of rectifier 34. The control voltage acts so as to control the resistance of the variable resistance means 29. The resistors 24, 26 and 27, the amplifier 25, the capacitor 28 and the variable resistance means 29 form a variable gain amplifier having a negative feedback loop. The configuration of this variable gain amplifier is shown in FIG. 4.

Referring to FIG. 4, when the open gain and the input impedance of the amplifier 25 are very large and the output impedance thereof is very small, the gain of this configuration is given by following equation 1;

$$G = (2R_2/R_1) \cdot [1 + jwc\ (R_2 + 2R_3/2)]/[1 + jwcR_3] \quad (1)$$

in which $R_1$ is the resistance value of the resistor 24, $R_2$ is the resistance of the resistors 26 and 27, $C$ is the capacitance of the capacitor 28, and $R_3$ is the resistance of the variable resistance means 29. From the Equation 1, it is evident that the frequency characteristics of the gain are changed according to the value of $R_3$. The frequency characteristics of the variable gain amplifier according to the Equation 1 are plotted in FIG. 5, in which the curve A shows the frequency characteristic when the value of $R_3$ is small and curve B corresponds to the frequency characteristic when the value of $R_3$ approaches infinity. It is possible to get intermediate characteristics between the characteristics A and B continuously by changing the value of $R_3$ continuously. Accordingly, if the variable resistance means 29 is controlled so that the resistance $R_3$ thereof approaches infinity when the input signal contains high level signal components, the frequency characteristic of the gain becomes flat at a high level signal component. Also if the variable resistance means 29 is controlled so that the resistance $R_3$ thereof becomes small when the input signal level is low, the characteristic is such that the higher frequency components are emphasized. As a result, the characteristic is provided in which the low level signal components are emphasized, i.e., the compression characteristic as shown by the curve 9 in FIG. 2a. Such a compression characteristic is provided only for the high frequency signal components, as is evident from FIG. 5.

Next, when the switches 21 and 22 are connected to the P side, the resistance 24 is connected to the feedback loop of the amplifier 25, and the network consisting of the resistors 26 and 27, the capacitor 28 and the variable resistance means 29 is connected to the input side of the amplifier 25. The signal to be applied to the high pass filter 31 in the control circuit 36 is supplied from the output terminal 35. That is, the first circuit and the second circuit are exchanged for each other, and the control circuit 36 provides a control voltage in response to the high frequency signal components of the output signal. The configuration of the variable gain amplifier in this case is shown in FIG. 6.

Under the same conditions as those for the Equation 1 the gain of the configuration shown in FIG. 6 is given by the following Equation 2;

$$G = (R_1/2R_2) \cdot [1 + jwcR_3]/[1 + jwc(R_2+2R_3/2)] \quad (2)$$

in which the same letters designate the same factors as those of the Equation 1. The frequency characteristic of the variable gain amplifier is plotted in FIG. 7 according to the Equation 2, in which curve C corresponds to the frequency characteristic when the value of $R_3$ is small and the curve D corresponds to the frequency characteristic when the value of $R_3$ approaches infinity. It is possible to get intermediate characteristics between the characteristics C and D continuously, similar to the case of FIG. 5. Accordingly, if the variable resistance means 29 is controlled so that the resistance thereof approaches infinity at a high level of the output signal components and so that the resistance thereof becomes small at a low level of the output signal components, the expansion characteristic as shown by the curve 11 in FIG. 2b is provided for the high frequency signal components of the reproduced signal. Since the Equation 2 is the reciprocal to of the Equation 1, the compression characteristic during the recording and the expansion characteristic during the reproduction become perfectly complementary. This shows that the complementary compression and expansion characteristics are achieved very easily by changing the switches.

As described above, the noise reduction system of the invention provides the compression characteristic during the record mode and the expansion characteristic during the reproduction mode, which are perfectly complementary to each other, and therefore the output signal has the same waveform as that of the original signal. As for the high level signal components, the output signal has of course the same waveform as that of the original signal because of the linear characteristics at the high level signal during both of the record and reproduction. The record medium noises which include the high frequency component such as tape hiss are reduced by the amount of expansion because they are only related to the expansion characteristic in the reproduction mode.

In the following, the operation of the control circuit 36 will be described. In the control circuit 36, the high pass filter 31 is provided so that the compression and expansion characteristics are provided only for the high frequency signal components, and the frequency range in which the control circuit 36 acts can be set freely by selecting a suitable cut-off frequency of the high pass filter 31. It is also possible to omit the high pass filter 31 so as to provide the compression and expansion characteristics over the whole range of the signal. The limit amplifier 32 amplifies the signal passed through the high pass filter 31. The limiter 33 limits the output amplitude of limit amplifier 32 to a constant value for a large input amplitude. The rectifier 34 rectifies the output of the limiter 33, and produces a D.C. voltage to control the variable resistance means 29 which is composed of a component such as a transistor, field effect transistor or diode. The D.C. voltage from the rectifier 34 does not change very sharply for the input signal, becuase the signal amplified by the limit amplifier 32 is limited by the limiter 33, and therefore the resistance of the variable resistance means 29 is changed smoothly. The charge and discharge time constants of the rectifier 34 decide the transient time for the change of the characteristic from a linear characteristic to compression and expansion characteristics and vice versa. Therefore, these charge and discharge time constants are selected to give the optimum value for hearing.

The performance of the limit amplifier 32 and the limiter 33 has a large effect on the compression and expansion characteristics shown in FIG. 2 *a* and *b*. When the compression and expansion characteristics have sharp changes as shown by the curve *a* in FIG. 8, in which only the expansion characteristic is shown, the amount of reduction of the noises varies remarkably according to the input signal level. Such fluctuation in background noises is very annoying for a listener. According to the experimental results, when the compression and expansion characteristics change gradually as shown by the curve *b* in FIG. 8, the fluctuation of the background noises is reduced, and is hardly annoying.

As shown in FIG. 12, a field effect transistor 48 can be employed for the variable resistance means 29 in FIG. 3, since the resistance between the drain and source of the FET is changed greatly by a slight variation in the gate voltage. Therefore, the variation range of the control signal has to be limited to a small variation range by means of the limiter 33 in the control circuit 36. FIG. 9 shows the circuit diagram commonly used for the limiter 33. The transfer function G of this circuit is expressed by the following Equation 3;

$$G = R_D/(R + R_D) \quad (3)$$

in which $R_D$ is the composite resistance of the diodes 42 and 43 connected in parallel with each other, and $R$ is the resistance of the resistor 41. From the Equation 3, it is evident that G becomes nearly one in the range of a low input signal level because the amplitude of the signal across the diodes 42 and 43 is small and $R_D$ becomes very large, so that the condition $R_D >> R$ is established. But, with a gradual increase of the input signal, $R_D$ gradually becomes smaller and G becomes nearly equal to $R_D/R$ in the range where there exists the condition $R_D << R$. Accordingly, the transfer function (G) is determined by $R_D$, that is, the characteristics of the diodes 42 and 43. The characteristic of this limiter circuit is shown by a curve *a* in FIG. 11.

As is obvious from the above description if the limit amplifier 32 is a linear amplifier, the limit characteristic of the control circuit 36 is not sufficient. An improved limit characteristic is achieved by providing a limit amplifier 32 which is composed as shown in FIG. 10. Referring to FIG. 10, an amplifier 47, a resistor 44, and diodes 45 and 46 form a feedback amplifier. When the open gain of the amplifier 47 is very large, the transfer function G′ of this circuit is expressed by the following Equation 4;

$$G' = R_D/Ri \quad (4)$$

in which $R_D$ is the composite resistance of the diodes 45 and 46, connected in parallel to each other and Ri is the resistance of the resistor 44.

The input-output transfer characteristic of this limit amplifier 32 is shown by a curve *b* in FIG. 11, in which the variation of the range of the input signal necessary to cause the change $\Delta V$ in the output voltage is $\Delta ei$ for the characteristic shown by the curve *a* and $\Delta ei'$ for the characteristic shown by the curve *b*. That is the characteristic of the curve *b* has a larger variation of the range of the input signal for the same variation of the range of the output voltage than that of the characteristic of the curve *a*. In the expansion characteristic shown in FIG. 8, this is explained as follows. The variation of the range of the input signal necessary to get the same amount of the expansion is $\Delta ei$ for the characteristic shown by the curve *a* and $\Delta ei'$ for the characteristic of the curve *b*. Accordingly, the characteristic of the curve *b* in FIG. 8 has a more gradual expansion characteristic than that of the curve *a*. As described above, the gradual expansion and compression characteristics are achieved by providing a limiter amplifier having the diodes in the feedback loop. In FIG. 3, if the circuit as described above is used for the limit amplifier 32, it is possible to omit the limiter 33. Of course, it is possible to use both the limit amplifier 32 and the limiter 33 having the limit characteristic.

There is described hereinbefore a preferred embodiment of the invention, and it is apparent that various modifications may be made without departing from the spirit and scope of the invention. For example, automatic noise reduction can be provided in the principle form of the invention without using the control means, that is by a configuration comprising the first and second impedance means and the signal amplifier. Further, even if the second impedance means does not include a bypass circuit, the noise reduction will be provided. The scope of the invention is defined by the following claims.

What we claim is:

1. An automatic noise reduction system for a signal handling system which has first and second functions comprising an input terminal, an output terminal, a signal amplifier having an input and an output side, a first impedance means, a second impedance means and two switches each having a first terminal, a second terminal and a common terminal; a first terminal of one switch of said two switches being coupled to said input terminal, a second terminal of said one switch being coupled to said output terminal and a common terminal of said one switch being coupled to one end of said first impedance means, a first terminal of the other switch of said two switches being coupled to said output terminal, a second terminal of said other switch being coupled to said input terminal and a common terminal of said other switch being coupled to one end of said second impedance means, the other end of said first impedance means and said second impedance means being coupled to said input side of said signal amplifier and said output side of said signal amplifier being connected directly to said output terminal; wherein when said common terminals of said two switches are connected to said first terminals, said first impedance means is connected between said input terminal and said input side of said signal amplifier, and said second impedance means is connected between said input and said output sides of said signal amplifier for carying out said first function; and when said common terminals of said two switches are connected to said second terminals, said second impedance means is connected between said input terminal and said input side of said signal amplifier, and said first impedance means is connected between said output terminal and said input side of said signal amplifier for carrying out said second function; whereby the input-output transfer characteristic of said automatic noise reduction system during said first function is substantially complementary to that during said second function.

2. An automatic noise reduction system as claimed in claim 1, wherein said first impedance means is a resistor and said second impedance means comprising two resistors connected in series with each other and a bypass circuit means having two terminals, one terminal of which is connected to a junction point of said two resistors and the other terminal of which is grounded.

3. An automatic noise reduction system as claimed in claim 2, wherein a bypass circuit means comprises a capacitor and a variable resistance means connected in series with each other.

4. An automatic noise reduction system as claimed in claim 3, wherein said variable resistance means is a field effect transistor.

5. An automatic noise reduction system as claimed in claim 1 wherein said noise reduction system further comprises a control means which is coupled at one end thereof to said second impedance means and is connected, at another end thereof, to the junction point of said first impedance means and said one of said two switches whereby said second impedance means is supplied with a D.C. voltage related to the input signal to said automatic noise reduction system when said switches are in one position and is supplied with the output signal of said automatic noise reduction system when said switches are in the other position.

6. An automatic noise reduction system as claimed in claim 5, wherein said control means comprises a series connected high pass filter, an amplifier having an input terminal and an output terminal, a limiter and a rectifier for supplying a D.C. voltage in response to high frequency components of the input signal to said automatic noise reduction system while said switches are in said one position, and also supplying a D.C. voltage in response to high frequency components of the output signal from said automatic noise reduction system while said switches are in said other position.

7. An automatic noise reduction system as claimed in claim 6 wherein said amplifier in said control means includes a parallel connection of two diodes in reverse polarity to each other, said parallel connection of diodes being connected between said input terminal and said output terminal of said amplifier in said control means.

8. An automatic noise reduction system as claimed in claim 5 wherein said first impedance means is a resistor and said second impedance means comprises two resistors connected in series with each other and a bypass circuit having one terminal thereof connected to a junction point of said two resistors and the other terminal thereof grounded.

9. An automatic noise reduction system as claimed in claim 8, wherein said bypass circuit comprises a variable resistance means, the resistance value of which is varied with the change of said D.C. voltage supplied from said control means.

10. An automatic noise reduction system as claimed in claim 9 wherein said bypass circuit comprises a capacitor and said variable resistance means connected in series with each other.

* * * * *